(12) United States Patent
Goffette

(10) Patent No.: US 7,377,987 B2
(45) Date of Patent: May 27, 2008

(54) STEEL CUTTING SYSTEM AND METHOD

(75) Inventor: Julien Goffette, Deyvillers (FR)

(73) Assignee: Edw. C. Levy Co., Detroit, MI (US)

( * ) Notice: Subject to any disclaimer, the term of this patent is extended or adjusted under 35 U.S.C. 154(b) by 357 days.

(21) Appl. No.: 11/037,683

(22) Filed: Jan. 18, 2005

(65) Prior Publication Data
US 2005/0178474 A1    Aug. 18, 2005

Related U.S. Application Data

(60) Provisional application No. 60/538,823, filed on Jan. 23, 2004.

(51) Int. Cl.
*B23K 7/00*    (2006.01)

(52) U.S. Cl. ......................... 148/197; 148/205; 266/48; 266/51

(58) Field of Classification Search ................. 266/48, 266/50, 51; 148/197, 205
See application file for complete search history.

(56) References Cited

U.S. PATENT DOCUMENTS 5,312,091 A * 5/1994 Vogrin .......................... 266/51

* cited by examiner

*Primary Examiner*—Kevin P. Kerns
(74) *Attorney, Agent, or Firm*—Honigman Miller Schwarts & Cohn LLP

(57) ABSTRACT

A steel cutting system has a cutting torch on a first side of a slab of steel. A pair of oxygen jets is placed on a second side of the slab of steel.

34 Claims, 4 Drawing Sheets

STEEL CUTTING SYSTEM AND METHOD

RELATED APPLICATIONS

The present invention claims priority on provisional patent application, Ser. No. 60/538,823, filed on Jan. 23, 2004, entitled "Method and Apparatus for Cutting Steel Structures".

FIELD OF THE INVENTION

The present invention relates generally to the field of steel processing and more particularly to a steel cutting system and method.

BACKGROUND OF THE INVENTION

In most steel making processes, steel slabs exiting a continuous caster must be cut to precise dimensions before they can be processed further. This cutting is usually accomplished with an oxycutting torch. Unfortunately molten metal at the exit of the cut or kerf cools and forms burrs or anomalies on the surface of the slab near the cut. Generally these burrs must be removed before further processing. Commonly, the burrs are removed manually by chiseling or with torches. One solution has been to use a single oxygen jet at the exit point that points along the cut line. This keeps the molten metal hot and is intended to allow the molten metal to fall off by gravity. While this system does seem to reduce the size of the burrs it does not eliminate them.

Thus there exists a need for a system and method that automatically eliminates burrs and anomalies created in cutting a slab of steel.

SUMMARY OF INVENTION

A steel cutting system that overcomes these and other problems has a cutting torch on a first side of a slab of steel. A pair of oxygen jets is placed on a second side of the slab of steel. One of the pair of oxygen jets is behind an exit point of the cutting torch. A second of the pair of oxygen jets is ahead of the exit point of the cutting torch. One of the pair of oxygen jets is to a side of an exit point of the cutting torch. A second of the pair of oxygen jets is spaced farther from the exit point of the cutting torch than the one of the pair of oxygen jets. The second of the pair of oxygen jets has a component that points perpendicular to a cut line. The one of the pair of oxygen jets points along the cut line.

In one embodiment, a method of cutting a steel slab includes the steps of cutting a steel slab using a torch from a first side of the steel slab. A stream of oxygen is applied to a second side of the steel slab near an exit point sufficient to allow all the molten metal to be removed by gravity. A first jet of oxygen is applied behind the exit point and along the direction of a cut line and to a side of the cut line. A second jet of oxygen is applied ahead of the exit point and farther to the side of the cut line than the first jet of oxygen. A supply of oxygen in the first jet of oxygen is regulated. The second jet of oxygen is pointed so that it has a component perpendicular to the cut line.

In one embodiment, a device for eliminating metal burrs has a housing coupled to a cutting torch. A stream of oxygen has a portion ahead of an exit point of a cut and has a component pointed perpendicular to a cut line. The housing moves synchronously with the cutting torch. The stream of oxygen may include a pair of blasting oxygen jet nozzles spaced on either side of the cut line. The stream of oxygen may include a pair of containing oxygen jet nozzles. The pair of blasting oxygen jet nozzles may be spaced behind the exit point. The pair of containing oxygen jet nozzles may be spaced in front of the exit point. The pair of containing oxygen jet nozzles may be farther spaced laterally from the cut line than the pair of blasting oxygen jet nozzles. A pair of regulators may be coupled to the pair of blasting oxygen jet nozzles.

DETAILED DESCRIPTION OF THE DRAWINGS

The system for cutting a slab of steel uses a number of oxygen jets to ensure that any molten metal from the cutting torch stays molten until gravity has allowed the metal to fall from the slab of steel. One of the oxygen jets is behind the exit point of the torch and adjacent to a cut line. This oxygen jet provides the initially heating of any molten globs of metal from the cutting torch. A second oxygen jet provides additional heating of any globs of metal that begin to move outside the first jet of oxygen. This provides any additional heat necessary for the molten globs of metal to fall off of the slab of metal before solidifying.

Figure 1:
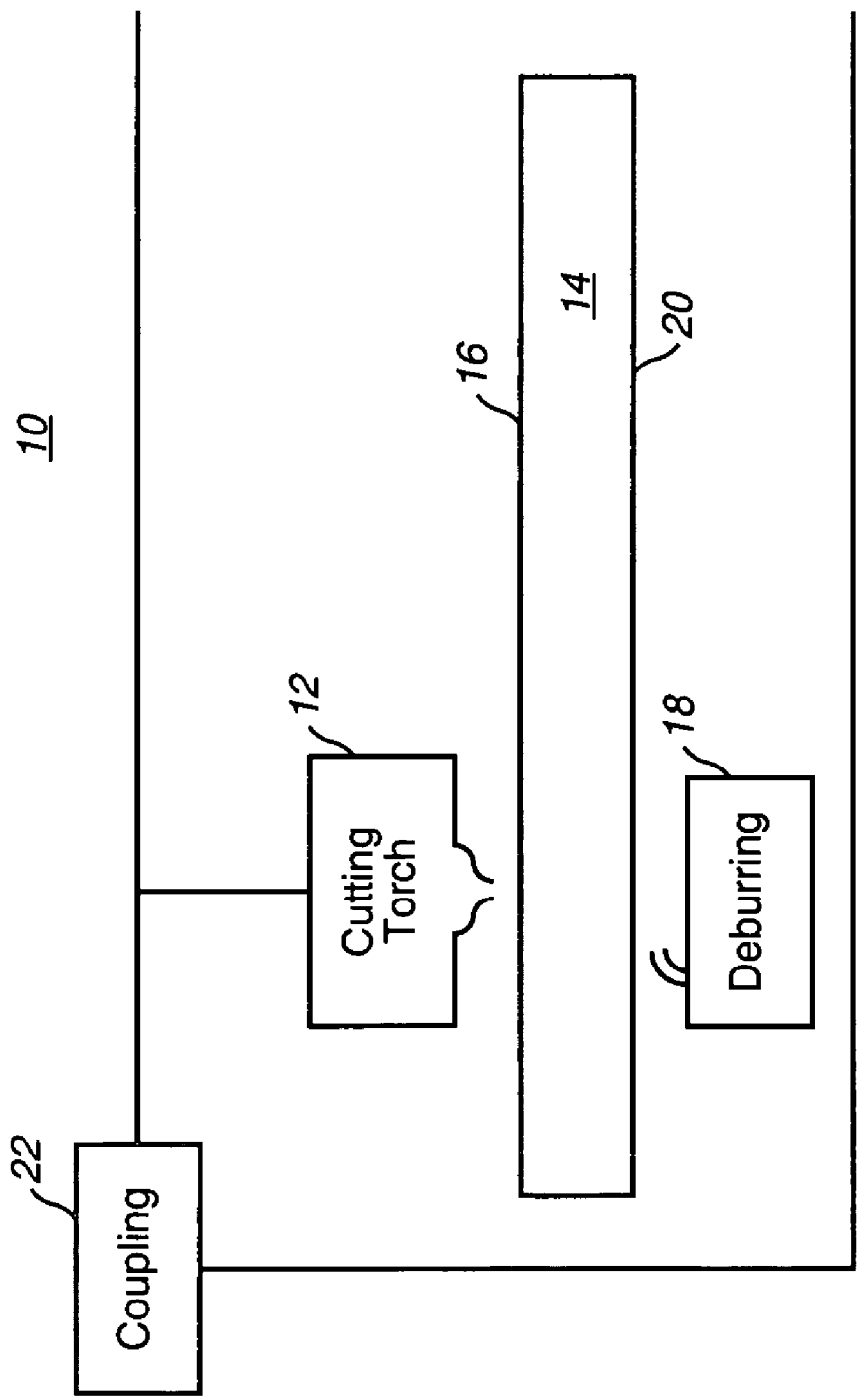
FIG. 1 is a schematic view of a cutting system in accordance with one embodiment of the invention.

FIG. 1 is a schematic view of a cutting system 10 in accordance with one embodiment of the invention. The system 10 has a cutting torch 12 for cutting a slab of metal 14. Commonly the cutting torch is a oxycutting torch, however other types of suitable cutting devices may be used. The cutting torch 12 is on a first side 16 of the metal slab 14. A deburring device 18 is on a second side 20 of the metal slab 14. A coupling device 22 ensures that the cutting torch 12 and the deburring device 18 travel synchronously along the metal slab 14 as it is being cut.

Figure 2:
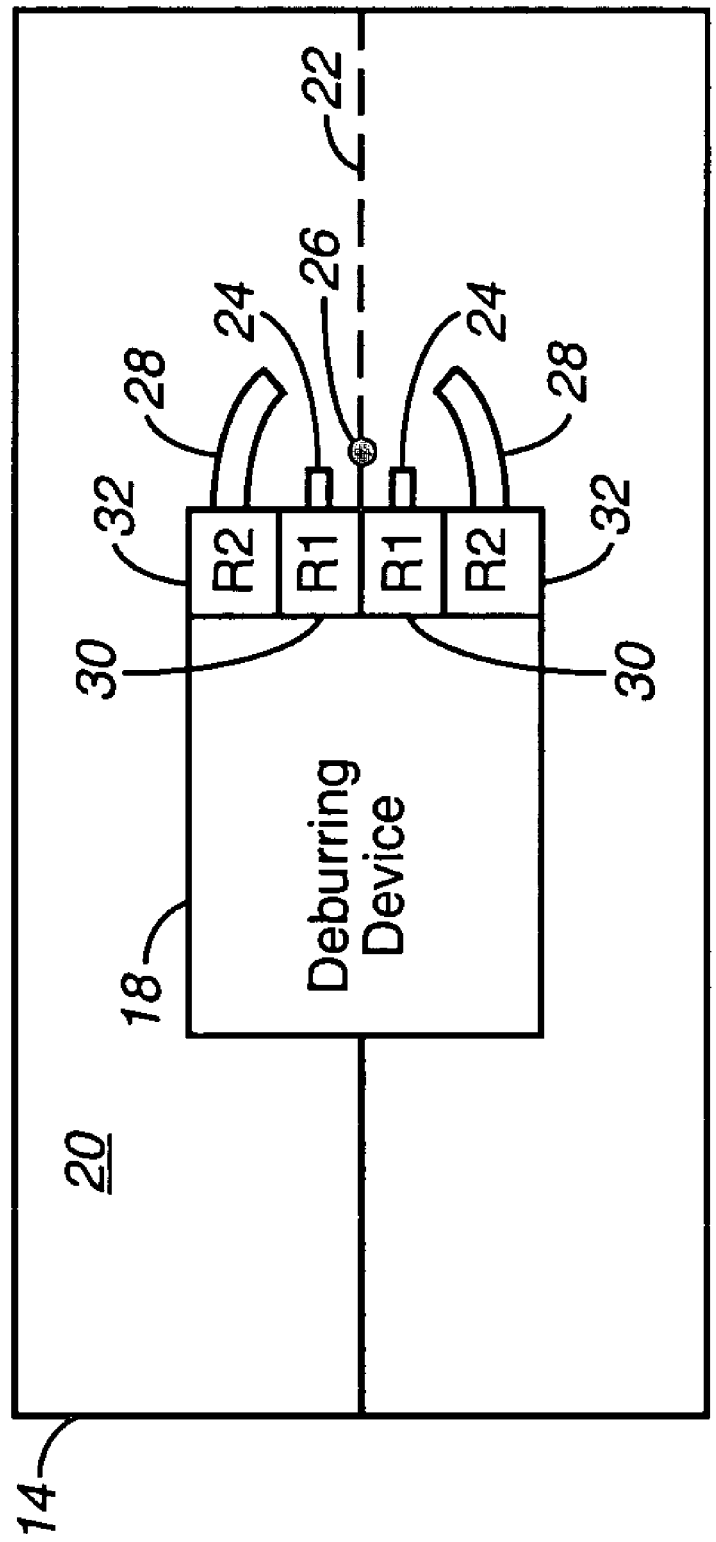
FIG. 2 is a schematic view of a cutting system in accordance with one embodiment of the invention.

FIG. 2 is a schematic view of a cutting system 10 in accordance with one embodiment of the invention. The deburring device 18 is shown centered over a cut line 21 of the slab of metal 14. The deburring device 18 has a pair of blasting oxygen jet nozzles 24 on either side of the cut line 21. The pair of blasting jet nozzles 24 are behind the exit point 26 of the cutting torch 12. A pair of containing jet nozzles 28 is in front of the exit point 26 and spaced laterally farther from the cut line 21 than the blasting jet nozzles 24. Note that the containing jets 28 are curved so that the flow of oxygen will have a component that is perpendicular to the cut line. There are regulators (R1) 30 for the blasting nozzles 24 and regulators (R2) 32 for the containing nozzles 28.

In one embodiment, the jet nozzles 24 & 28 may be replaced with a slit nozzle through which a stream of oxygen is forced. A stream as used herein is wider than a single round jet and may be made up of a number of jets. The slit nozzle would preferable be placed at around a 45 degree angle to the cut line 22. The oxygen jets or stream may be pure oxygen. Alternatively, it may contain less than pure oxygen as long as the oxygen level is sufficient to keep, the reaction of the molten metal going. In an alternative embodiment, the oxygen jets could be replaced with torches. However, this is not preferred.

Figure 3:
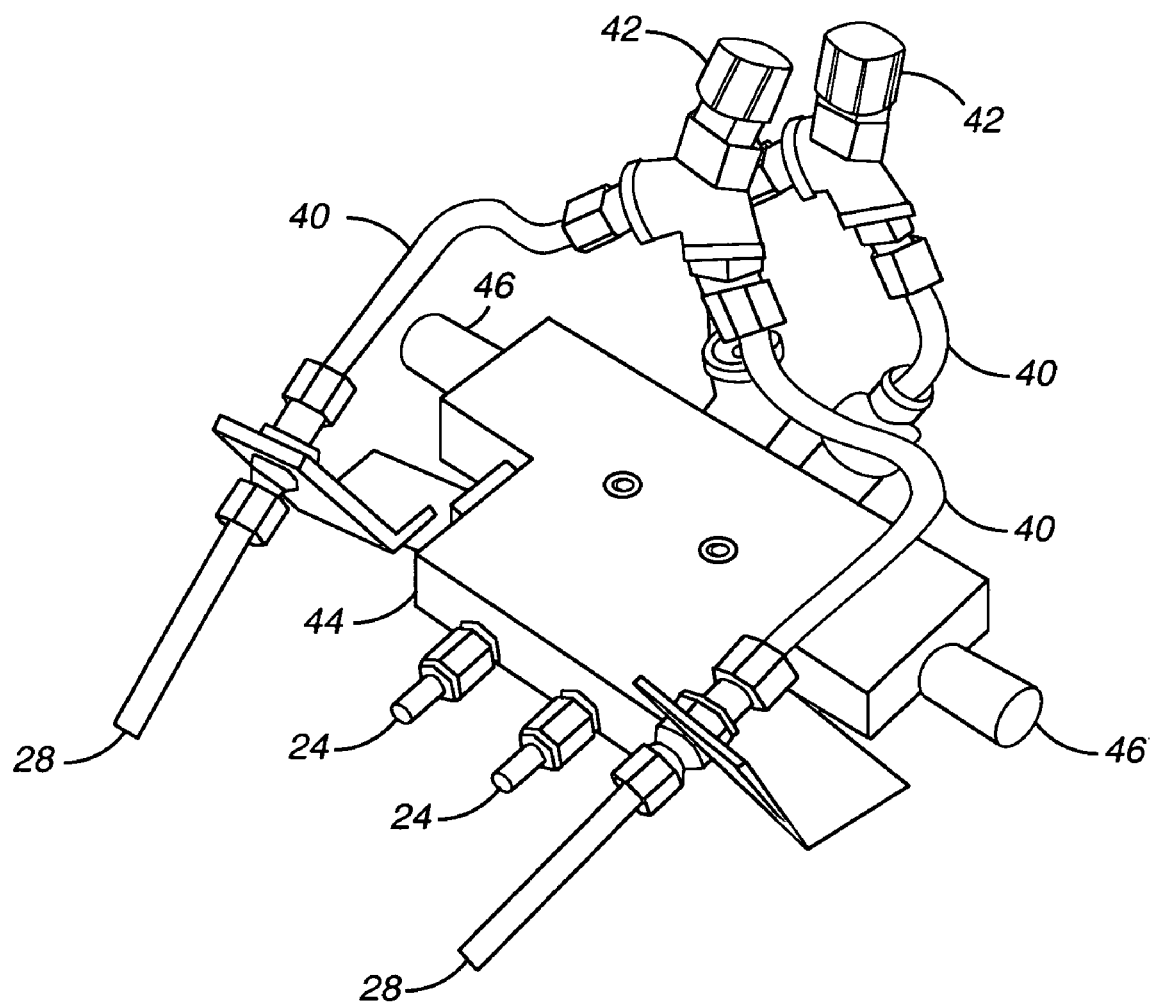
FIG. 3 is a top left perspective view of a deburring device in accordance with one embodiment of the invention.
Figure 4:
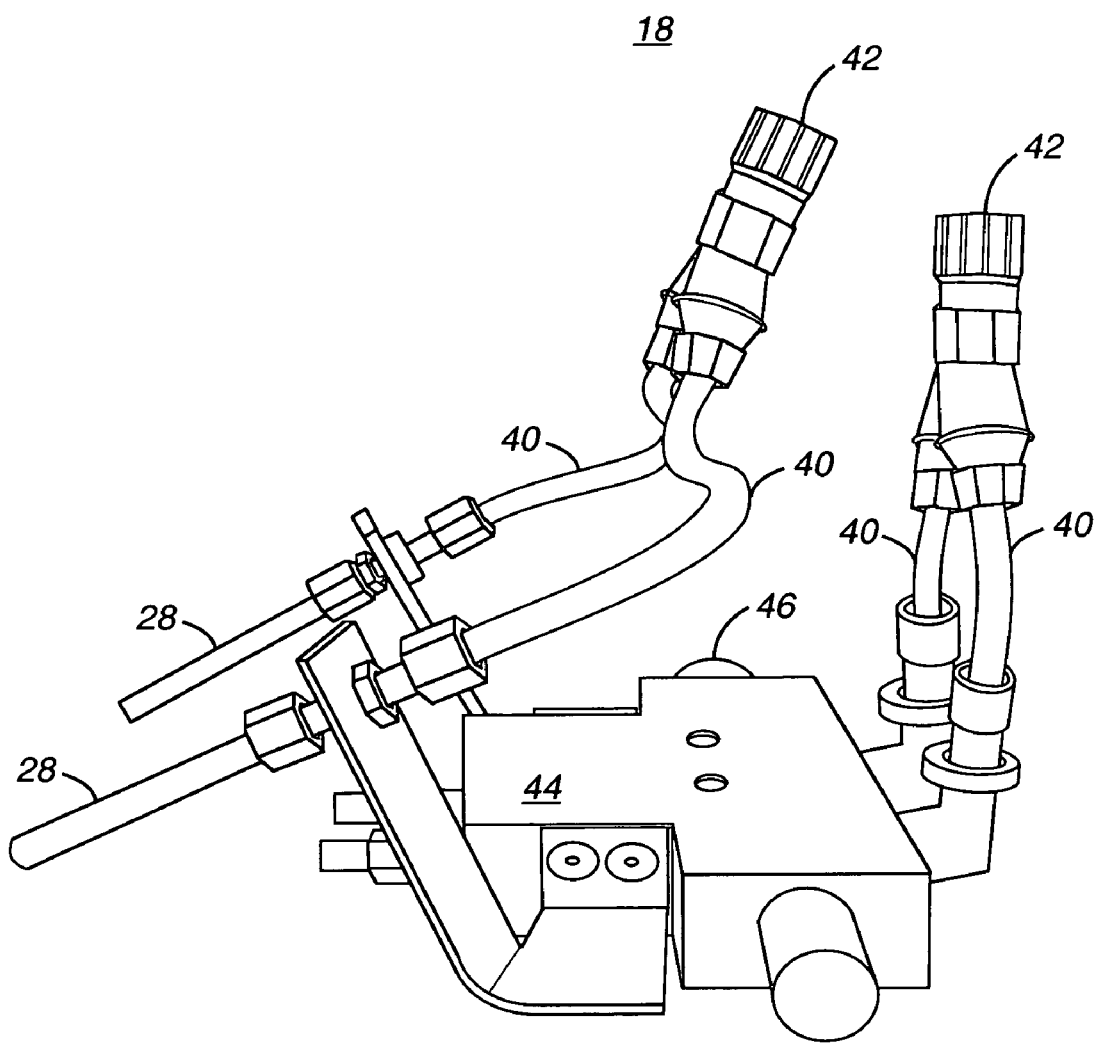
FIG. 4 is a side view of a deburring device in accordance with one embodiment of the invention.

FIG. 3 is a top left perspective view of a deburring device 18 in accordance with one embodiment of the invention. The device 18 has a pair of containing jet nozzles 28 that point down towards the metal slab and towards each other. A pair of blasting oxygen nozzles 24 point parallel to the side of the metal slab. The nozzles 24 and 28 are coupled by tubing 40 to connectors 42. The connectors 42 connect the nozzles to a source of oxygen. A housing 44 holds the connectors 42, tubing 40 and the nozzles 24, 28. A pair of pins 46 on the side of the housing 44 are used to hold the housing 44 and move it along the metal slab. Alternatively, the metal slab may be moved along the cutting device. FIG. 4 is a side view of a deburring device 18 in accordance with one embodiment of the invention. Certain features may be more clearly seen in this figure.

Thus there has been described a system and method of cutting a metal slab that eliminates the need for an expensive and time consuming deburring processes after cutting the metal slab. The device uses a first jet of oxygen to ensure that any globs of metal from the cutting torch are not allowed to solidify. A second jet of oxygen further heats any globs of metal that fall outside the first nozzles jet of oxygen. This ensures that the globs of metal stay molten until the fall from the slab of metal.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A steel slab de-burring system, wherein a cutting device is positioned proximate a first side of a steel slab to provide a cut line through the steel slab that extends through the steel slab from the first side of the steel slab to a second side of the steel slab, wherein one or more molten metal globs from the cut steel slab accumulates proximate an exit point of the cut line at the second side, comprising:
   a source consisting of pure oxygen;
   a housing in fluid communication with the source consisting of pure oxygen, wherein the housing directs pure oxygen from the source consisting of pure oxygen toward said one or more molten metal globs and separates said one or more molten metal globs from said steel slab by way of said pure oxygen being delivered through
   one or more metal glob containing nozzles, and
   one or more metal glob blasting nozzles.

2. The steel slab de-burring system of claim 1, wherein said one or more metal glob blasting nozzles are arranged behind said exit point.

3. The steel slab de-burring system of claim 2, wherein said one or more metal glob containing nozzles are arranged ahead of said exit point.

4. The steel slab de-burring system of claim 1, wherein said one or more metal glob blasting nozzles are arranged substantially parallel with respect to said cut line.

5. The steel slab de-burring system of claim 4, wherein said one or more metal glob containing nozzles are arranged laterally with respect to said cut line and at a distance farther from said cut line than that of said one or more metal glob blasting nozzles.

6. The steel slab de-burring system of claim 5, wherein said one or more metal glob containing nozzles are arranged substantially perpendicular with respect to said cut line.

7. The steel slab de-burring system of claim 6, wherein said one or more metal glob containing nozzles are curved.

8. The steel slab de-burring system of claim 1, wherein said one or more metal glob containing nozzles, and said one or more metal glob blasting nozzles include jet nozzles.

9. The steel slab de-burring system of claim 1, wherein said one or more metal glob containing nozzles, and said one or more metal glob blasting nozzles include slit nozzles.

10. The steel slab de-burring system of claim 1, wherein said one or more metal glob containing nozzles are arranged proximate said second side of said steel slab, and said one or more metal glob blasting nozzles are arranged proximate said second side of said steel slab.

11. The steel slab de-burring system of claim 1 further comprising one or more pure oxygen regulators coupled to one or more of the blasting and containing nozzles.

12. A method of preventing burrs from forming as a result of molten metal globs cooling and solidifying when processing a steel slab, wherein the processing includes positioning a steel slab cutting device proximate a first side of the steel slab that creates a cut line through the steel slab that extends from the first side to a second side of the steel slab, wherein, once the cut line has substantially extended through the first side to the second side, said one or more molten metal globs accumulates proximate an exit point of the cut line at the second side, comprising the steps of:
   applying a first stream consisting of pure oxygen from one or more metal glob blasting nozzles to said second side of said steel slab proximate said exit point;
   applying a second stream consisting of pure oxygen from one or more metal glob containing nozzles to said second side of said steel slab proximate said exit point;
   maintaining a reaction of said molten metal globs by way of the application of the first and second streams consisting of pure oxygen to prevent said molten metal globs from solidifying; and
   separating said molten metal globs from said second side of said steel slab.

13. The method of claim 12, wherein said applying a first stream step includes the step of arranging said one or more metal glob blasting nozzles behind said exit point.

14. The method of claim 13, wherein said applying a second stream step includes the step of arranging said one or more metal glob containing nozzles laterally with respect to said cut line and at a distance farther that of said one or more metal glob blasting nozzles.

15. The method of claim 14, further including the step of regulating said application of the first and second streams consisting of pure oxygen.

16. The method of claim 14, further including the step of arranging the one or more metal glob containing nozzles substantially perpendicular with respect to said cut line.

17. A device for separating molten metal globs arising from a cutting device that cuts a steel slab, wherein the device prevents the formation of metal burrs on said steel slab proximate an exit point of a cut line, comprising:
   a source consisting of pure oxygen; and
   a molten metal glob separating device in fluid communication with said source consisting of pure oxygen, wherein said molten metal glob separating device delivers a stream consisting of pure oxygen toward molten metal globs, wherein the stream consisting of pure oxygen is delivered ahead of and substantially perpendicular to said exit point of said cut line.

18. The device of claim 17, wherein the molten metal glob separating device and cutting device are coupled by way of a coupling device to permit synchronous travel of the molten metal glob separating device and the cutting device with respect to said steel slab.

19. The device of claim 18, wherein the stream consisting of pure oxygen is provided from a pair of blasting nozzles spaced and arranged substantially parallel to said cut line.

20. The device of claim 19, wherein the stream consisting of pure oxygen is provided from a pair of containing nozzles.

21. The device of claim 20, wherein the pair of blasting nozzles are spaced at a distance behind said exit point.

22. The device of claim 21, wherein the pair of containing nozzles are spaced at a first distance in front of said exit point.

23. The device of claim 22, wherein the pair of containing nozzles are arranged laterally and substantially perpendicularly with respect to said cut line at a second distance greater than said first distance.

24. The device of claim 19, further comprising a pair of regulators coupled, respectively, to said blasting nozzles and said containing nozzles.

25. The steel slab de-burring system of claim 19, wherein said one or more metal glob containing nozzles, and said one or more metal glob blasting nozzles include jet nozzles.

26. The steel slab de-burring system of claim 19, wherein said one or more metal glob containing nozzles, and said one or more metal glob blasting nozzles include slit nozzles.

27. A steel slab de-burring system, wherein a cutting device is positioned proximate a first side of a steel slab to provide a cut line through the steel slab that extends through the steel slab from the first side of the steel slab to a second side of the steel slab, wherein one or more molten metal globs from the cut steel slab accumulates proximate an exit point of the cut line at the second side, comprising:
   a housing; and
   means for heating and subsequently separating said one or more molten metal globs from said steel slab, wherein said means is provided with said housing, wherein the means includes:
   a source consisting of pure oxygen;
   a housing in fluid communication with the source consisting of pure oxygen, wherein the housing directs pure oxygen from the source consisting of pure oxygen toward said one or more molten metal globs and separates said one or more molten metal globs from said steel slab by way of said pure oxygen being delivered through,
   one or more metal glob containing nozzles, and
   one or more metal glob blasting nozzles.

28. The steel slab de-burring system of claim 27, wherein the means includes a plurality of torches.

29. The steel slab de-burring system of claim 28, wherein the plurality of torches are arranged:
   proximate said second side of said steel slab,
   behind said exit point,
   ahead of said exit point,
   substantially parallel with respect to said cut line, and
   laterally and substantially perpendicular with respect to said cut line.

30. The steel slab de-burring system of claim 27, wherein the one or more metal glob containing nozzles are arranged:
   proximate said second side of said steel slab,
   behind said exit point, and
   substantially parallel with respect to said cut line, wherein the one or more metal glob blasting nozzles are arranged:
   proximate said second side of said steel slab,
   ahead of said exit point,
   laterally and substantially perpendicular with respect to said cut line.

31. The steel slab de-burring system of claim 27, wherein said one or more metal glob containing nozzles are curved.

32. The steel slab de-burring device of claim 27, further comprising a pair of regulators coupled, respectively, to said blasting nozzles and said containing nozzles.

33. The steel slab de-burring system of claim 27, wherein said one or more metal glob containing nozzles, and said one or more metal glob blasting nozzles include jet nozzles.

34. The steel slab de-burring system of claim 27, wherein said one or more metal glob containing nozzles, and said one or more metal glob blasting nozzles include slit nozzles.

* * * * *